United States Patent
Choi et al.

(10) Patent No.: US 12,459,756 B2
(45) Date of Patent: Nov. 4, 2025

(54) SUBSTRATE TRANSFER DEVICE AND SUBSTRATE TRANSFER METHOD

(71) Applicants: SAMSUNG ELECTRONICS CO., LTD., Suwon-si (KR); TREEZE ENGINEERING, Hwaseong-si (KR)

(72) Inventors: Dong Chol Choi, Hwaseong-si (KR); Sung Hyo Son, Hwaseong-si (KR); Yong Jun Ahn, Suwon-si (KR); Yu Dong Won, Suwon-si (KR); Soo Yeup Lee, Seoul (KR); Il Kyu Lee, Seoul (KR); Hyun Woo Lee, Hwaseong-si (KR); Kyoung Rak Lim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1035 days.

(21) Appl. No.: 17/520,034

(22) Filed: Nov. 5, 2021

(65) Prior Publication Data

US 2022/0258990 A1    Aug. 18, 2022

(30) Foreign Application Priority Data

Feb. 15, 2021    (KR) .................. 10-2021-0019621

(51) Int. Cl.
*B65G 47/90*    (2006.01)
(52) U.S. Cl.
CPC .................................. *B65G 47/90* (2013.01)
(58) Field of Classification Search
CPC .................................................. B65G 47/90
See application file for complete search history.

(56) References Cited

U.S. PATENT DOCUMENTS

| | | |
|---|---|---|
| 8,712,600 B2 | 4/2014 | Hayashi |
| 9,758,310 B2 | 9/2017 | Murao |
| 9,896,275 B2 | 2/2018 | Ikenaga et al. |
| 10,037,908 B2 | 7/2018 | Ota |
| 10,604,899 B2 | 3/2020 | Horii et al. |

(Continued)

FOREIGN PATENT DOCUMENTS

| | | |
|---|---|---|
| JP | 3-282309 A2 | 12/1991 |
| JP | 2008-074593 A2 | 4/2008 |

(Continued)

OTHER PUBLICATIONS

Notice of Allowance issued on Nov. 13, 2023 in corresponding Appln No. KR 10-2021-0019621.

(Continued)

*Primary Examiner* — Eric S. McCall
(74) *Attorney, Agent, or Firm* — MORGAN, LEWIS & BOCKIUS LLP

(57) ABSTRACT

A substrate transfer device includes: a traveling unit including a traveling wheel that travels on a rail to transfer a substrate in a first direction; a rail unit including the rail and a rail protrusion protruding from the rail in a second direction different from the first direction; and a sensor unit including a first sensor and a second sensor, wherein the first sensor senses the traveling unit, and the second sensor senses the rail protrusion, wherein the first and second sensors are placed at the same position as each other along the rail on a basis of the first direction.

20 Claims, 7 Drawing Sheets

(56) References Cited

U.S. PATENT DOCUMENTS

| | | | | |
|---|---|---|---|---|
| 2021/0269259 | A1* | 9/2021 | Lasserre | B65G 37/00 |
| 2024/0038563 | A1* | 2/2024 | Lee | H01L 21/67724 |
| 2024/0174440 | A1* | 5/2024 | Yoon | H01L 21/67733 |
| 2025/0001433 | A1* | 1/2025 | Choi | B03C 1/30 |
| 2025/0136383 | A1* | 5/2025 | Lee | B65G 35/06 |
| 2025/0149365 | A1* | 5/2025 | Kim | H01L 21/68742 |
| 2025/0160264 | A1* | 5/2025 | Stefani | A01G 31/06 |

FOREIGN PATENT DOCUMENTS

| | | |
|---|---|---|
| KR | 10-2001-0111697 A | 12/2001 |
| KR | 10-0660794 | 12/2006 |
| KR | 10-1214185 | 12/2012 |
| KR | 10-1742981 | 6/2017 |
| KR | 10-2019-0011015 | 2/2019 |
| KR | 10-2020-0016593 | 2/2020 |
| KR | 10-2020-0068964 | 6/2020 |

OTHER PUBLICATIONS

1st OA issued in corresponding Korean Appln No. KR 10-2021-0019621 on Aug. 16, 2023.

* cited by examiner

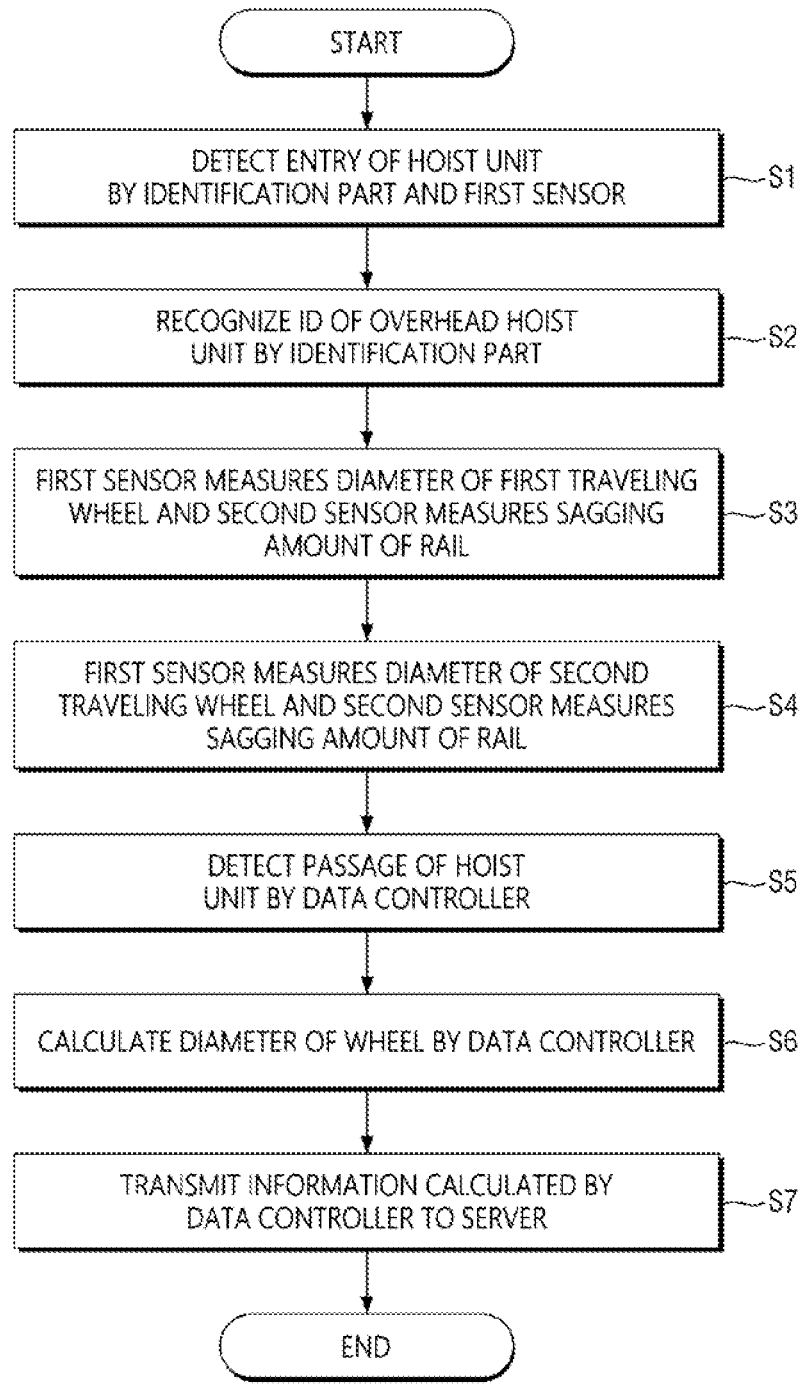

SUBSTRATE TRANSFER DEVICE AND SUBSTRATE TRANSFER METHOD

CROSS-REFERENCE TO RELATED APPLICATION

This application claims priority under 35 U.S.C. § 119 to Korean Patent Application No. 10-2021-0019621 filed on Feb. 15, 2021 in the Korean Intellectual Property Office, the disclosure of which is incorporated by reference herein in its entirety.

TECHNICAL FIELD

The present inventive concept relates to a substrate transfer device and a substrate transfer method.

DISCUSSION OF THE RELATED ART

In general, a semiconductor or a display device may be fabricated by repeatedly performing a series of fabricating processes on a substrate such as a silicon wafer or a glass substrate. For example, fabricating processes such as deposition, photoetching, oxidation, ion implantation, and cleaning may be performed selectively and/or repeatedly to form circuit patterns on the substrate.

Such fabricating processes may be performed in, for example, a clean room in which a pollution control method is performed. Substrate transfer between the fabricating processes is performed, by providing the substrate to a process facility, which performs the process, or by retrieving the substrate from the process facility. Typically, a carrier containing a plurality of substrates, for example, a front opening unified pod (FOUP), a front opening shipping box (FOSB), and the like, may be used for substrate transfer between the fabricating processes. Such a carrier may generally be transferred by an overhead hoist transport (OHT). Generally, the overhead hoist transport transfers the carrier containing the substrates before process treatment, loads the carrier on an empty storage structure, picks up the carrier containing the substrates subjected to the process treatment from the storage structure, and transports the carrier to the outside.

Generally, a ceiling traveling transfer device, such as an OHT device, may include traveling rails installed on the ceiling of a clean room, and a traveling unit configured to move on the traveling rails. A hoist unit for transporting an object to be transferred may be mounted on the lower part of the traveling unit.

SUMMARY

According to an exemplary embodiment of the present inventive concept, a substrate transfer device includes: a traveling unit including a traveling wheel that travels on a rail to transfer a substrate in a first direction; a rail unit including the rail and a rail protrusion protruding from the rail in a second direction different from the first direction; and a sensor unit including a first sensor and a second sensor, wherein the first sensor senses the traveling unit, and the second sensor senses the rail protrusion, wherein the first and second sensors are placed at the same position as each other along the rail on a basis of the first direction.

According to an exemplary embodiment of the present inventive concept, an article transfer device includes: a traveling unit including a traveling wheel that travels on a rail in a first direction; a rail unit including the rail and a rail protrusion protruding from the rail in a second direction different from the first direction; and a sensor unit including a first sensor and a second sensor, wherein the first sensor senses the traveling unit, and the second sensor senses the rail protrusion, wherein the traveling wheel is configured to travel on the rail to the rail protrusion such that the traveling wheel corresponds to the rail protrusion.

According to an exemplary embodiment of the present inventive concept, a substrate transfer method includes: detecting entry of a hoist unit by an identification part, wherein the hoist unit is connected to a traveling unit traveling on a rail and including a traveling wheel, wherein the rail extends in a first direction; measuring, by using a first sensor, a diameter of the traveling wheel at a time when the traveling wheel travels on the rail, to which a rail protrusion is connected; and measuring, by using a second sensor, a descending height of the rail protrusion at the time when traveling wheel travels on the rail, wherein the measuring of the diameter of the traveling wheel is performed at the same time as the measuring of the descending height of the rail protrusion, wherein the first and second sensors are placed at the same position as each other along the rail on a basis of the first direction.

BRIEF DESCRIPTION OF THE DRAWINGS

The above and other features of the present inventive concept will become more apparent by describing in detail exemplary embodiments thereof, with reference to the accompanying drawings, in which:

FIG. 7 is a flowchart for explaining a substrate transfer method according to an exemplary embodiment of the present inventive concept.

DETAILED DESCRIPTION OF THE EMBODIMENTS

Figure 1:
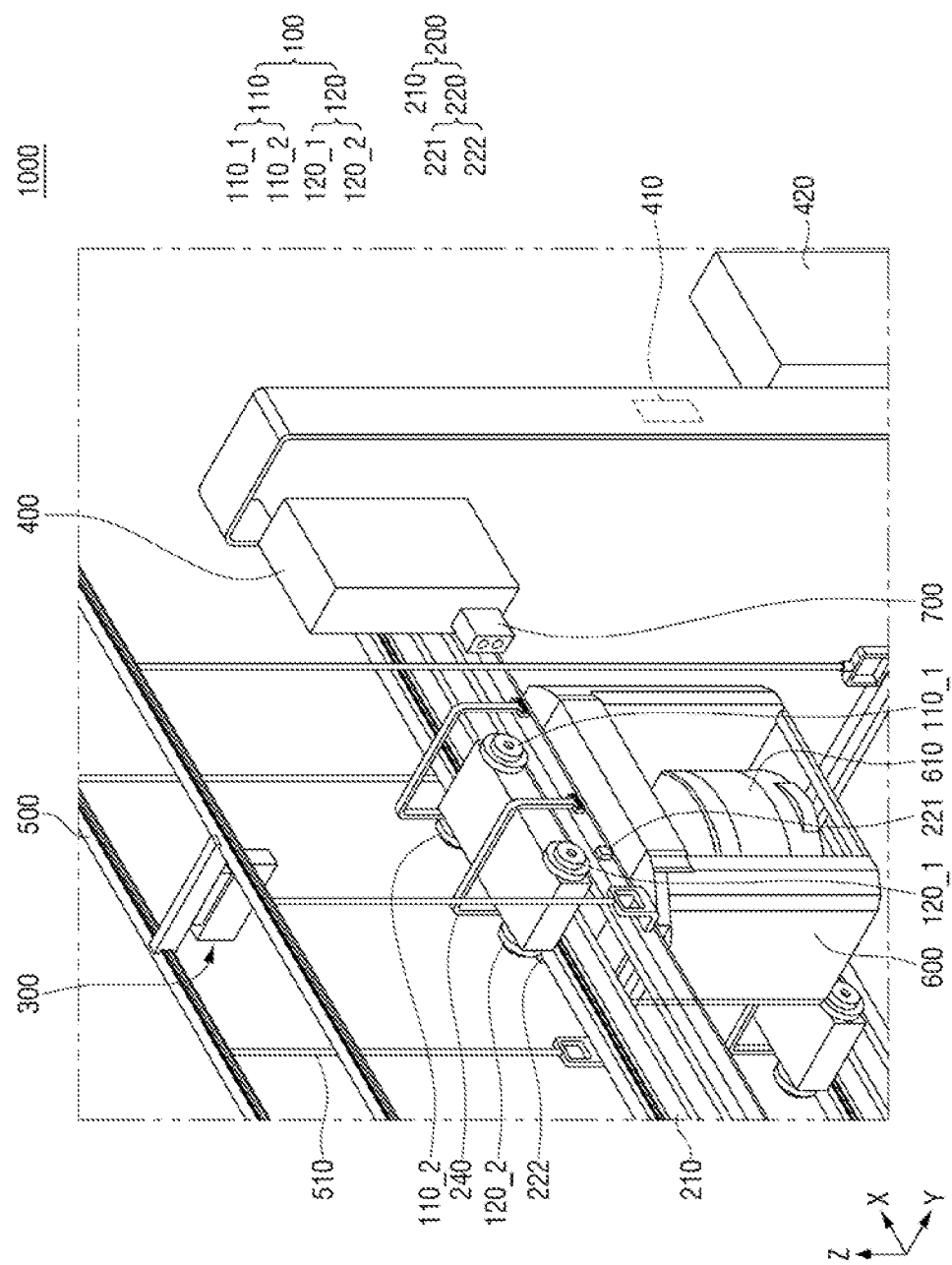
FIG. 1 illustrates a diagram for explaining a substrate transfer device according to an exemplary embodiment of the present inventive concept.
Figure 2:
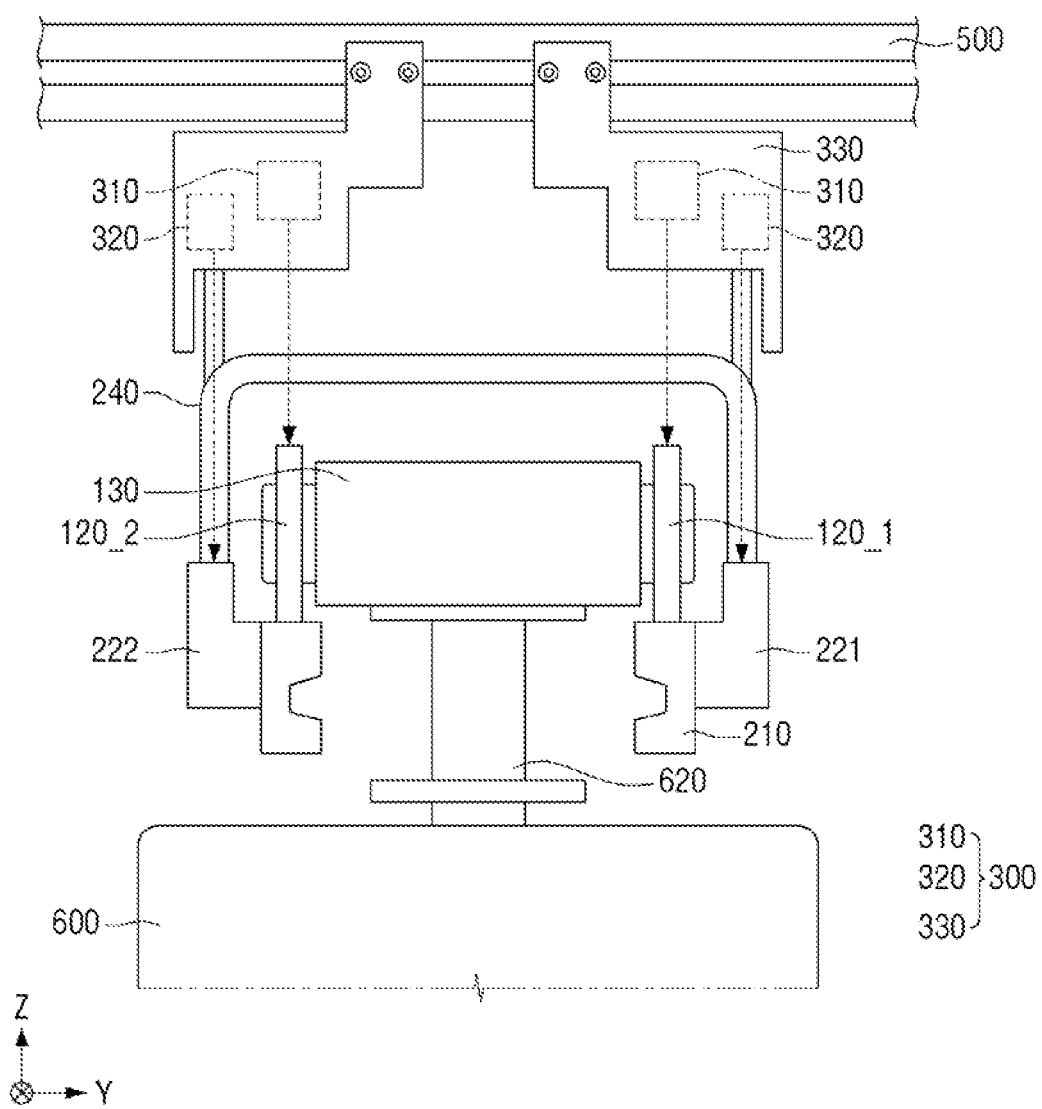
FIG. 2 is a front view of the substrate transfer device of FIG. 1.
Figure 3:
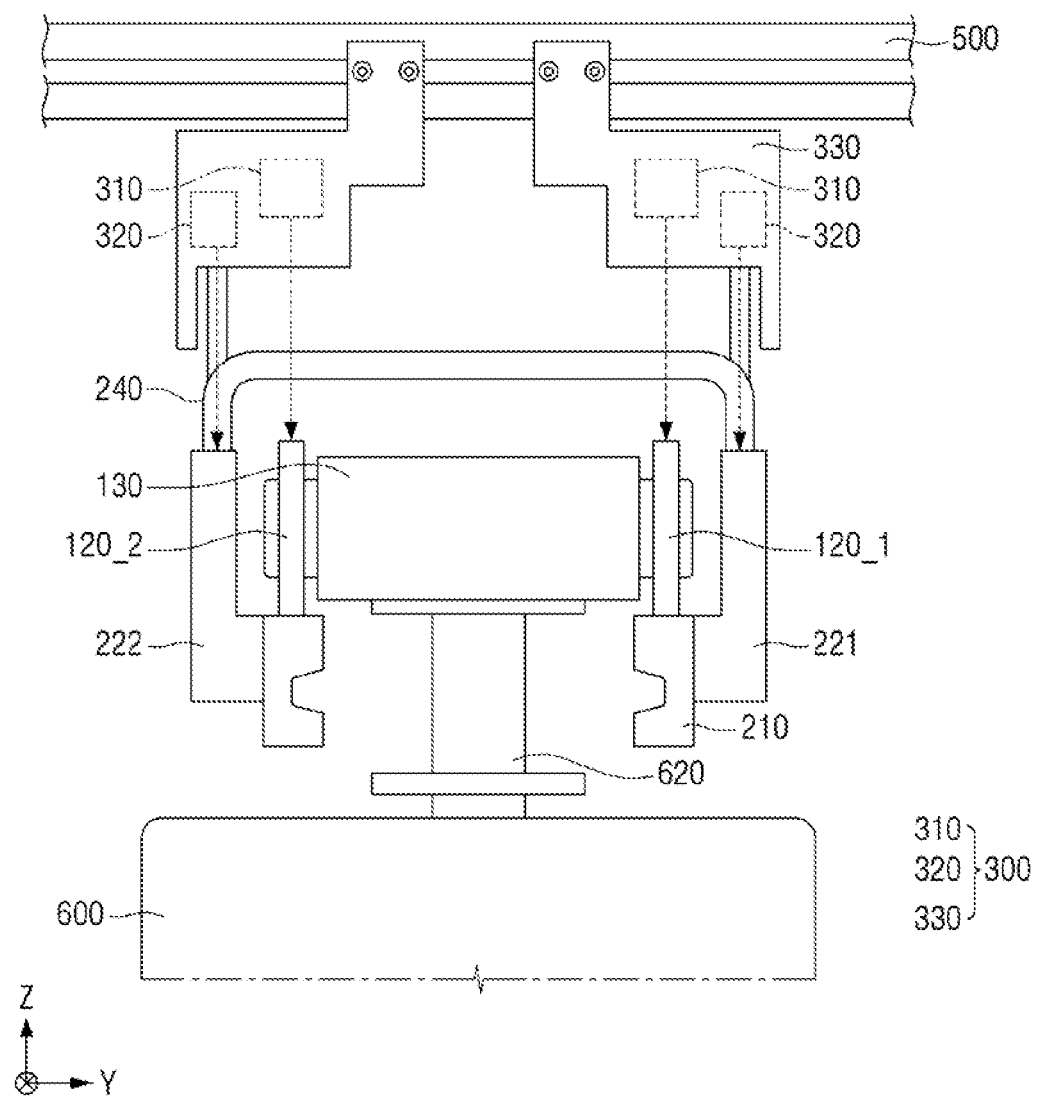
FIG. 3 is a front view of the substrate transfer device according to an exemplary embodiment of the present inventive concept.
Figure 4:
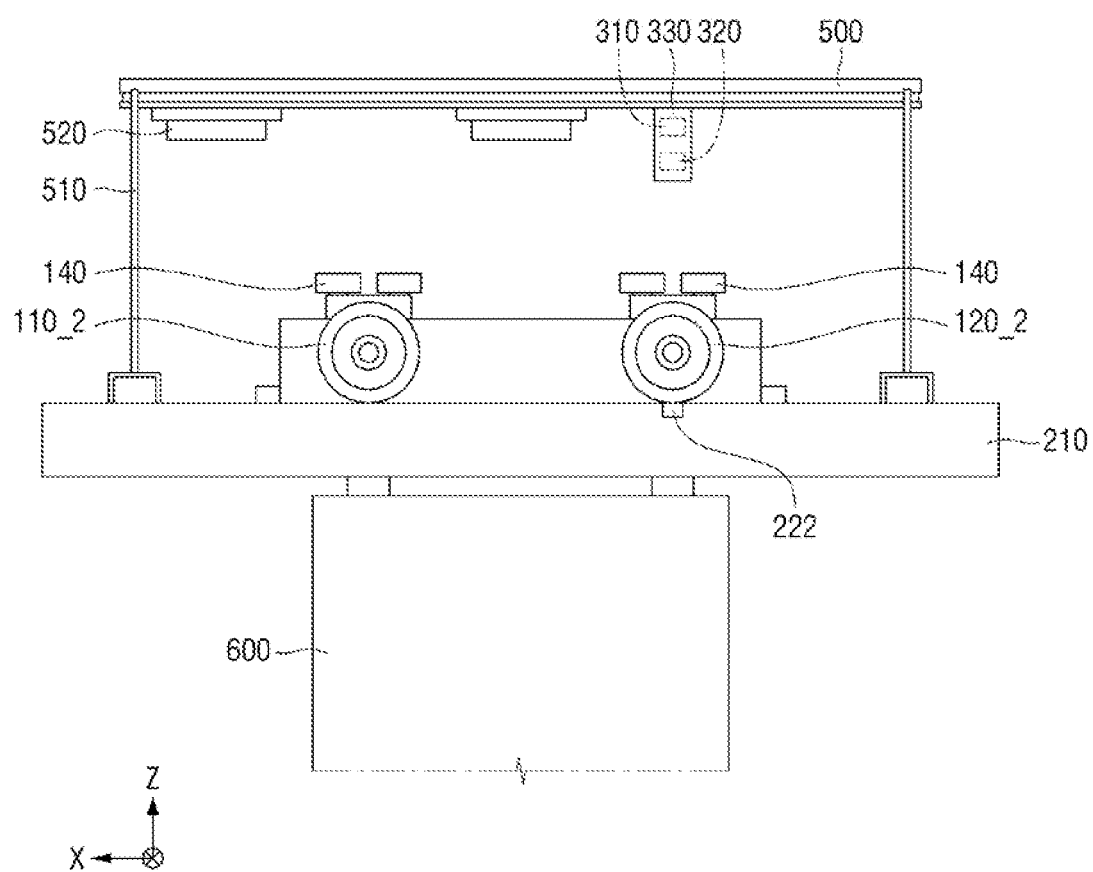
FIG. 4 is a side view of the substrate transfer device of FIG. 1.

FIG. 1 illustrates a diagram for explaining a substrate transfer device according to an exemplary embodiment of the present inventive concept. FIG. 2 is a front view of the substrate transfer device of FIG. 1. FIG. 3 is a front view of the substrate transfer device according to an exemplary embodiment of the present inventive concept. FIG. 4 is a side view of the substrate transfer device of FIG. 1.

Referring to FIGS. 1 and 2, a substrate transfer device according to an exemplary embodiment of the present inventive concept may include a traveling unit 100, a rail unit 200, a sensor unit 300, a base panel 500, and a hoist unit 600.

In an exemplary embodiment of the present inventive concept, a first direction X is a direction in which the traveling unit 100 travels. A second direction Y is a direction different from the first direction X, and may, for example, be a direction substantially perpendicular to the first direction X. A third direction Z is a direction different from each of the first and second directions X and Y, and may, for example, be a direction substantially perpendicular to each of the first and second directions X and Y.

The traveling unit 100 may include traveling wheels 110 and 120 placed on the rail 210, a traveling body (e.g., a traveling part) 130 on which the traveling wheels 110 and 120 are mounted, and guide wheels 140 which are placed on the traveling body 130 and support and guide the traveling unit 100 at a branching point. The traveling body 130 may include a first driving unit (including, e.g., a circuit and a motor) for rotating the traveling wheels 110 and 120, and a second drive unit (including, e.g., a circuit and a motor) for moving the guide wheels 140 in a left-right direction with respect to the traveling direction. The guide wheels 140 may be placed on a movable member configured to be movable in the left-right direction. In addition, additional sensors that may measure the amount of wear, surface delamination, cracks, and the like of the guide wheels 140 may be included in the substrate transfer device. For example, the additional sensors may be disposed on the traveling unit 100.

The traveling unit 100 includes traveling wheels 110 and 120, and the traveling unit 100 travels on the rail 210 to transfer the substrate. A traveling body 130 is placed between the traveling wheels 110 and 120. For example, the traveling unit 100 further includes a first traveling wheel 110 that travels on the rail 210 on the basis of the first direction X, and a second traveling wheel 120 spaced apart from first traveling wheel 110 in the first direction X. For example, on the basis of the first direction X, which is a moving direction of the traveling unit 100, the first traveling wheel 110 may be a front-wheel drive wheel, and the second traveling wheel 120 may be a rear-wheel drive wheel. The first traveling wheel 110 includes a first_1 traveling wheel 110_1 and a first_2 traveling wheel 110_2 spaced apart from each other in a second direction Y different from the first direction X. The second traveling wheel 120 includes a second_1 traveling wheel 120_1 and a second 2 traveling wheel 120_2 spaced apart from each other in the second direction Y different from the first direction X.

The rail unit 200 includes a rail 210 and a rail protrusion 220 protruding from the rail 210 in the second direction Y different from the first direction X. The rail unit 200 further includes a rail connection 240 that serves to balance the traveling unit 100 when the traveling unit 100 travels in the first direction X.

The traveling wheels 110 and 120 and the rail protrusions 221 and 222 are placed to correspond to each other on the basis of the first direction X. Referring to FIG. 1, the rail protrusion 220 includes a first rail protrusion 221 placed to correspond to a second_1 traveling wheel 120_1 of the second traveling wheels 120, and a second rail protrusion 222 placed to correspond to a second 2 traveling wheel 120_2 of the second traveling wheels 120. The rail protrusion 220 includes a first rail protrusion 221 placed to correspond to the first_1 traveling wheel 110_1 of the first traveling wheels 110, and a second rail protrusion 222 placed to correspond to the first_2 traveling wheel 110_2 of the first traveling wheels 110. The first and second rail protrusions 221 and 222 are placed to be spaced apart from each other in the second direction Y. For example, the first and second rail protrusions 221 and 222 are aligned with each other.

Referring to FIG. 2, an uppermost surface of the rail protrusion 220 may be placed below an uppermost surface of the traveling body 130. When the uppermost surface of the rail protrusion 220 is placed lower than the uppermost surface of the traveling body 130 and since the influence of the external force generated on the traveling unit 100 is reduced by the height of the rail protrusion 220, the diameter of the traveling wheels 110 and 120 can be measured more accurately. In addition, in this embodiment, the height of the uppermost surface of the rail protrusion 220 and the height of the uppermost surface of the traveling body 130 are not limited thereto, and as shown in FIG. 3, the uppermost surface of the rail protrusion 220 may be placed above the uppermost surface of the traveling part 130.

The sensor unit 300 includes a first sensor 310 that senses the traveling unit 100, and a second sensor 320 that senses the rail protrusion 220. The sensor unit 300 further includes a sensor support 330 that supports the first and second sensors 310 and 320. The first and second sensors 310 and 320 are supported by the sensor support 330 that is connected to the base panel 500, and the first and second sensors 310 and 320 can measure the displacement (or, e.g., distance) to the traveling wheels 110 and 120 and the rail protrusion 220. For example, the sensor support 330 may be a housing for the first and second sensors 310 and 320. For example, the first and second sensors 310 and 320 are placed below the base panel 500.

In this embodiment, the first and second sensors 310 and 320 may be, for example, displacement sensors or distance sensors. As an example, the first and second sensors 310 and 320 may be laser sensors. The first and second sensors 310 and 320 may each include a light-projector (e.g., a laser) that irradiates the projected light toward the object which reflects the projected light, and a light-receiver that receives the reflected light reflected from the object. Therefore, each of the first and second sensors 310 and 320 may measure the displacement (or, e.g., distance) from each of the first and second sensors 310 and 320 to the object.

The first and second sensors 310 and 320 are placed at the same position as each other along the rail 210 on the basis of the first direction X. Since the traveling wheels 110 and 120 and the rail protrusions 221 and 222 are placed to correspond to each other on the basis of the first direction X, the first and second sensors 310 and 320 that sense each of the traveling wheels 110 and 120 and the rail protrusions 221 and 222 are also placed at the same position. For example, when the first traveling wheels 110 are at the rail protrusions 221 and 222, the first and second sensors 310 and 320 may overlap the first traveling wheels 110 and the rail protrusions 221 and 222. For example, when the second traveling wheels 120 are at the rail protrusions 221 and 222, the first and second sensors 310 and 320 may overlap the second traveling wheels 120 and the rail protrusions 221 and 222.

Figure 5:
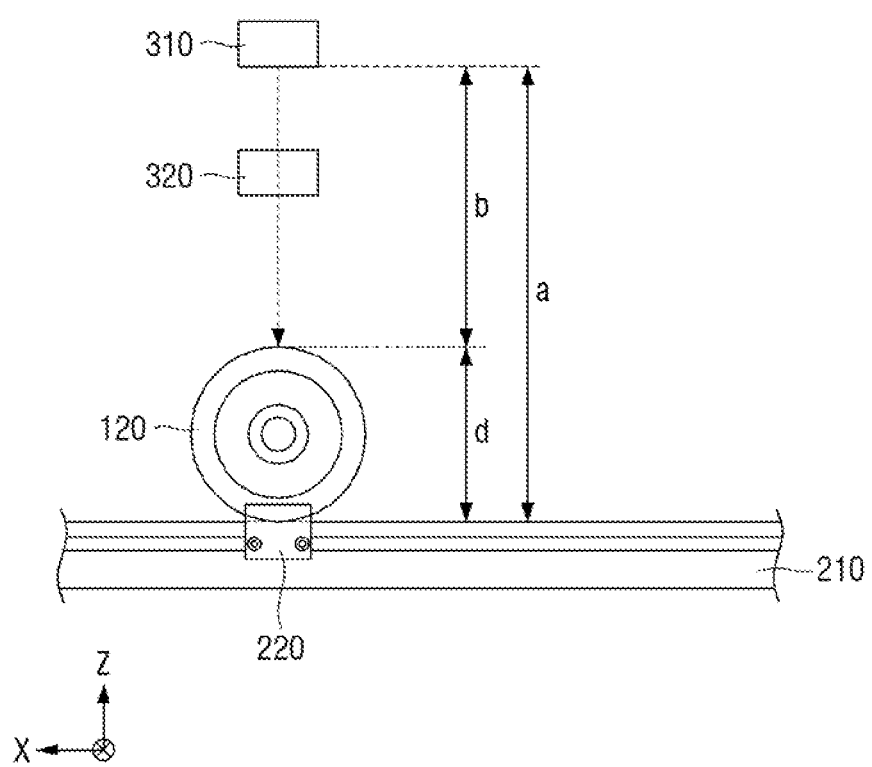
FIG. 5 is a diagram schematically illustrating a mechanism in which a first sensor of FIG. 4 measures a diameter of traveling wheels.
Figure 6:
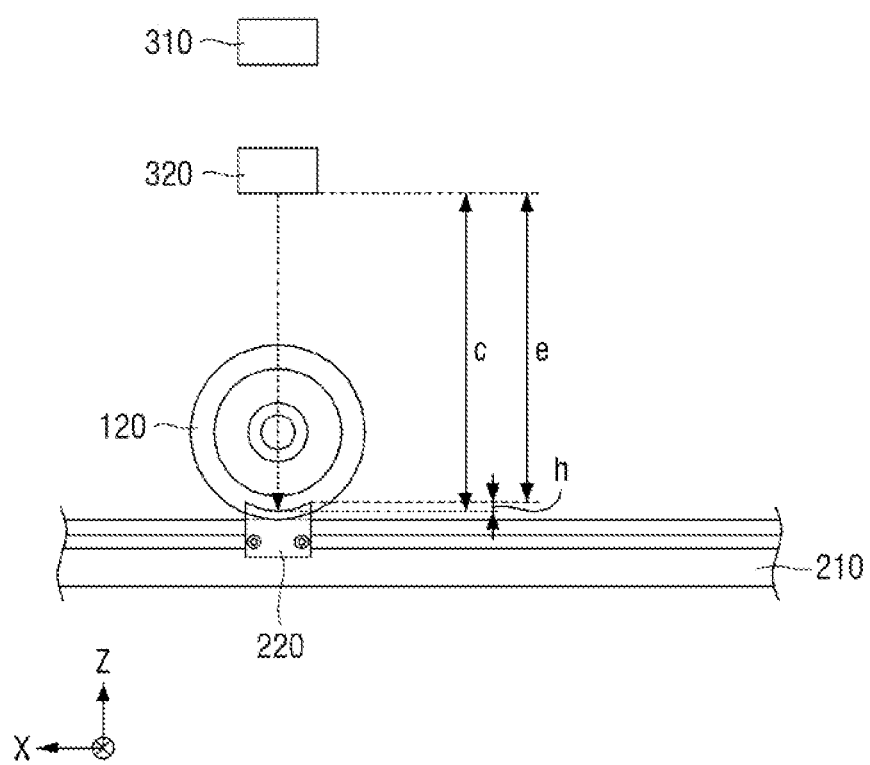
FIG. 6 is a diagram schematically illustrating a mechanism in which a second sensor of FIG. 4 measures a sagging height of a rail.

FIG. 5 is a diagram schematically illustrating a mechanism in which the first sensor of FIG. 4 measures the diameter of the traveling wheels. FIG. 6 is a diagram schematically showing a mechanism in which the second sensor of FIG. 4 measures a sagging height of the rail.

As the travel unit 100 moves along the first direction X, the first sensor 310 measures the diameter of the first traveling wheel 110, and then measures the diameter of the second traveling wheel 120.

The first sensor 310 measures a distance to the upper surface of the first traveling wheel 110 at the time point when the first traveling wheel 110, which is traveling on the rail 210, is located at a position on the rail 210 corresponding to the rail protrusion 220. For example, the first sensor 310 measures a diameter d of the traveling wheel 110 through a difference between a distance b, which is between the upper surface of the first traveling wheel 110 and the first sensor 310, and a distance a, which is between the upper surface of the rail 210 and the first sensor 310.

The second sensor 320 measures a distance to the lowest point of the upper surface of the rail protrusion 220 at the time when the first traveling wheel 110 travels on the rail 210 on the basis of the first direction X. For example, the second sensor 320 measures the distance to the lowest point of the upper surface of the rail protrusion 220 at the time when the first traveling wheel 110 is located at a position on the rail 210 corresponding to the rail protrusion 220. For example, the second sensor 320 measures a difference between a distance c, which is between the lowest point of the upper surface of the rail protrusion 220 and the second sensor 320, and a distance e, which is between the second sensor 320 and the upper surface of the rail protrusion 220 before the first traveling wheel 110 travels on the rail 210 at the position corresponding to the rail protrusion 220 on the basis of the first direction X. Thus, the second sensor 320 measures a sagging height h (or, e.g., a descending height) of the rail 210 when the first traveling wheel 110 travels on the rail 210. The sagging height h is the difference between distance c and distance e.

Referring to FIG. 5, the first sensor 310 measures the distance to the upper surface of the second traveling wheel 120 at the time when the second traveling wheel 120, which is traveling on the rail 210 on the basis of the first direction X, is located at the rail protrusion 220. For example, the first sensor 310 measures the diameter d of the second traveling wheel 120 through a difference between the distance b, which is between the upper surface of the second traveling wheel 120 and the first sensor 310, and the distance a, which is between the upper surface of the rail 210 and the first sensor 310.

Referring to FIG. 6, the second sensor 320 measures the distance to the lowest point of the upper surface of the rail protrusion 220 at the time when the second traveling wheel 120 travels on the rail 210 on the basis of the first direction X. For example, the second sensor 320 measures a difference between the distance c, which is between the lowest point of the upper surface of the rail protrusion 220 and the second sensor 320, and the distance e, which is between the second sensor 320 and the upper surface of the rail protrusion 220 before the second traveling wheel 120 travels on the rail 210 at the position corresponding to the rail protrusion 220 on the basis of the first direction X. Thus, the second sensor 320 measures the sagging height h of the rail 210 when the second traveling wheel 120 travels on the rail 210.

A data controller 400 calculates the diameters of the traveling wheels 110 and 120, by applying the sagging height h of the rail 210 measured by the second sensor 320 to the diameter d of each of the traveling wheels 110 and 120 measured by the first sensor 310. For example, the data controller 400 may adjust the diameter d of each of the traveling wheels 110 and 120 based on the sagging height h of the rail 210 to calculate the diameter of each of the traveling wheels 110 and 120. As a result, accurate diameters of the traveling wheels 110 and 120 in the substrate transfer device 1000 can be measured. Further, because the diameters of the traveling wheels 110 and 120 can be measured while the traveling unit 100 is traveling, the diameters of the traveling wheels 110 and 120 can be measured without stopping the traveling unit 100.

The base panel 500 is placed above the rail unit 200. For example, the base panel 500 may be installed adjacent to the ceiling of the semiconductor production line. The base panel 500 may extend in a direction parallel to the rail 210, e.g., in the first direction X. A plurality of base panels 500 may be formed to be spaced apart from each other in the second direction Y different from the first direction X. The base panel 500 and the rail 210 are connected to each other by the rail support 510. For example, there may be two base panels 500, and each base panel 500 may be connected to the rail 210 by the rail support 510.

Further, a guide rail 520 for adjusting the position of the guide wheel 140 may be placed on the lower surface of the base panel 500. The guide rail 520 may be placed along the traveling direction of the traveling unit 100, or the plurality of guide rails 520 may be placed at a predetermined interval in the traveling direction.

The sensor unit 300 is placed adjacent to the base panel 500. As the sensor unit 300 is placed closer to the base panel 500 than to the rail unit 200, the first sensor 310 can measure the diameter of the traveling wheels 110 and 120, and at the same time, the second sensor 320 can measure the sagging amount of the rail 210. For example, the sensor unit 300 is closer to the base panel 500 than to either of the rail 210 or rail protrusion 220.

The hoist unit 600 is placed below the rail 210 and is transferred by the traveling unit 100. The hoist unit 600 is connected to the traveling unit 100 by a connecting shaft 620, and is placed below the rail 210. For example, the connecting shaft 620 is connected to the traveling body 130. In an exemplary embodiment of the present inventive concept, the hoist unit 600 transfers the carrier 610 containing the substrate between process facilities, on which the semiconductor process is performed.

In addition, a lower obstacle detection sensor, a front obstacle detection sensor, a front distance sensor, and the like may be mounted on, for example, the traveling unit 100, the base panel 500, the rail unit 200, and/or the hoist unit 600. As an example, the lower obstacle detection sensor may be mounted below the hoist unit 600, and the front obstacle detection sensor and the front distance sensor may be mounted on the front portion of the hoist unit 600.

The lower obstacle detection sensor may be used to determine whether there is an obstacle below the hoist unit 600 when loading or unloading the object to be transferred, and the forward obstacle detection sensor may be used to determine whether there is an obstacle ahead while the traveling unit 100 is traveling. In addition, the forward distance sensor may be used to measure the distance to another traveling unit 100 located ahead.

An identification part 700 recognizes the hoist unit 600 when the hoist unit 600 enters the rail 210. For example, the identification part 700 may be a camera that identifies the identification information of the hoist unit 600. As an additional example, the identification part 700 may be a scanner. For example, the hoist unit 600 may have a barcode, identification number, or the like for identification purposes; however, the present inventive concept is not limited thereto.

FIG. 7 is a flowchart for explaining a substrate transfer method according to an exemplary embodiment of the present inventive concept.

First, the identification part 700 and the first sensor 310 detect the entry of the hoist unit 600 (S1). As the first sensor 310 measures the diameter of the traveling wheels 110 and 120, the entry of the traveling unit 100 is detected, and the identification part 700 recognizes this entry of the traveling unit 100 to detect entry of the hoist unit 600. Subsequently, the identification part 700 recognizes ID (e.g., identification information) of the hoist unit 600 (S2). As an example, ID of the hoist unit 600 may be printed on the front part of the hoist unit 600 in the form of numbers and/or letters.

After that, the first sensor 310 measures the diameter of the first traveling wheel 110, and at the same time, the second sensor 320 measures the sagging amount of the rail 210 (S3). For example, the first sensor 310 measures the distance to the upper surface of the first traveling wheel 110 when the first traveling wheel 110 is at a position on the rail 210 corresponding to the rail protrusion 220. For example, the first sensor 310 measures the diameter d of the first traveling wheel 110 through the difference between the distance b, which is between the first sensor 310 and the upper surface of the first traveling wheel 110, and the distance a, which is between the first sensor 310 and the upper surface of the rail 210. For example, the first sensor 310 may measure distance a before the first traveling wheel 110 travels on the rail 210 to the position corresponding to the rail protrusion 220.

The second sensor 320 measures the distance to the lowest point of the upper surface of the rail protrusion 220 at the time when the first traveling wheel 110 travels on the rail 210 on the basis of the first direction X. For example, the second sensor 320 measures a difference between the distance c, which is between the lowest point of the upper surface of the rail protrusion 220 and the second sensor 320, and the distance e, which is between the second sensor 320 and the upper surface of the rail protrusion 220 before the first traveling wheel 110 travels on the rail 210 at the position corresponding to the rail protrusion 220 on the basis of the first direction X. Thus, the second sensor 320 measures the sagging height h of the rail 210 when the first traveling wheel 110 travels on the rail 210.

After that, the first sensor 310 measures the diameter of the second traveling wheel 120, and at the same time, the second sensor 320 measures the sagging amount of the rail 210 (S4). The first sensor 310 measures the distance to the upper surface of the second traveling wheel 120 at a position corresponding to the rail protrusion 220 on the basis of the first direction X. For example, the first sensor 310 measures the diameter d of the second traveling wheel 120 through the difference between the distance b, which is between the first sensor 310 and the upper surface of the second traveling wheel 120, and the distance a, which is between the first sensor 310 and the upper surface of the rail 210. For example, the first sensor 310 may measure distance a before the second traveling wheel 120 travels on the rail 210 to the position corresponding to the rail protrusion 220.

The second sensor 320 measures the distance to the lowest point of the upper surface of the rail protrusion 220, at the time when the second traveling wheel 120 travels on the rail 210 on the basis of the first direction X. For example, the second sensor 320 measures a difference between the distance c, which is between the lowest point of the upper surface of the rail protrusion 220 and the second sensor 320, and the distance e, which is between the second sensor 320 and the upper surface of the rail protrusion 220 before the second traveling wheel 120 travels on the rail 210 at the position corresponding to the rail protrusion 220 on the basis of the first direction X. Thus, the second sensor 320 measures the sagging height h of the rail 210 when the second traveling wheel 120 travels on the rail 210.

After that, the data controller 400 detects the passage of the hoist unit 600 (S5). As the measurements of the first and second sensors 310 and 320 are completed, the data controller 400 may detect the passage of the hoist unit 600.

After that, the diameters (e.g., a final diameter) of the traveling wheels 110 and 120 may be calculated by the data controller 400 (S6) based on the sagging height h of the rail 210 measured by the second sensor 320 and the diameters d of the traveling wheels 110 and 120 measured by the first sensor 310. For example, by applying the sagging height h of the rail 210 measured by the second sensor 320 to the diameters d of the traveling wheels 110 and 120 measured by the first sensor 310 by the data controller 400, the diameters of the traveling wheels 110 and 120 can be calculated (S6). For example, the data controller 400 may adjust the diameters d of the traveling wheels 110 and 120 based on the sagging height h of the rail 210 to calculate the diameters of the traveling wheels 110 and 120. As another example, the sagging height h may be added to the diameters d of the traveling wheels 110 and 120 measured by the first sensor 310 to calculate the diameters of the traveling wheels 110 and 120. However, the present inventive concept is not limited thereto.

After that, information about the diameter of the traveling wheels 110 and 120 calculated by the data controller 400 is transmitted to a server through a port 410 (S7). For example, the port 410 may be a remote control port or a network port. The data controller 400 is connected to a power supply 420 and is supplied with power therefrom.

Accordingly, a user may receive accurate information on the diameters of the traveling wheels 110 and 120 while the traveling unit 100 is traveling.

While the present inventive concept has been described with reference to exemplary embodiments thereof, it will be understood by those of ordinary skill in the art that various changes in form and details may be made thereto without departing from the spirit and scope of the present inventive concept.

What is claimed is:

1. A substrate transfer device comprising:
   a traveling unit including a traveling wheel that travels on a rail to transfer a substrate in a first direction;
   a rail unit including the rail and a rail protrusion protruding from the rail in a second direction different from the first direction; and
   a sensor unit including a first sensor and a second sensor, wherein the first sensor senses the traveling unit, and the second sensor senses the rail protrusion,
   wherein the first and second sensors are located in a fixed position relative to the traveling unit traveling on the rail.

2. The substrate transfer device of claim 1, wherein the first and second sensors are placed at the same position as each other along the rail on a basis of the first direction.

3. The substrate transfer device of claim 1, further comprising:
   a base panel disposed above the rail unit,
   wherein the sensor unit is disposed adjacent to the base panel.

4. The substrate transfer device of claim 1, wherein the sensor unit further includes a sensor support that supports the first and second sensors.

5. The substrate transfer device of claim 1, wherein the traveling unit further includes a traveling part connected to the traveling wheel, and
   wherein an uppermost surface of the rail protrusion is disposed below an uppermost surface of the traveling part.

6. The substrate transfer device of claim 1, further comprising:
   a hoist unit which is disposed below the rail and is transferred by the traveling unit; and an identification part which recognizes the hoist unit,
wherein the identification part and the first sensor detect when the hoist unit enters the rail, and wherein the identification part recognizes identification information of the hoist unit.

7. The substrate transfer device of claim 1, wherein the first sensor measures a distance to an upper surface of the traveling wheel at a time when the traveling wheel is at a position on the rail corresponding to the rail protrusion, and the second sensor measures a distance to a lowest point of an upper surface of the rail protrusion at the time when the traveling wheel travels in the first direction on the rail.

8. The substrate transfer device of claim 7, wherein the traveling wheel includes a first traveling wheel which travels on the rail, and a second traveling wheel spaced apart from the first traveling wheel in the first direction, and wherein the first sensor measures a diameter of the first traveling wheel and a diameter of the second traveling wheel.

9. The substrate transfer device of claim 7, wherein the first sensor measures a diameter of the traveling wheel through a difference between a distance to the upper surface of the traveling wheel and a distance to the upper surface of the rail, and wherein the second sensor measures a sagging height of the rail when the traveling wheel travels on the rail, through a difference between the distance to the lowest point of the upper surface of the rail protrusion and the distance to the upper surface of the rail protrusion before the traveling wheel is at a position on the rail corresponding to the rail protrusion.

10. The substrate transfer device of claim 9, further comprising:

a data controller which calculates a diameter of the traveling wheel based on the sagging height of the rail measured by the second sensor and the diameter of the traveling wheel measured by the first sensor.

11. An article transfer device comprising:

a traveling unit including a traveling wheel that travels on a rail in a first direction;

a rail unit including the rail and a rail protrusion protruding from the rail in a second direction different from the first direction; and a sensor unit including a first sensor and a second sensor, wherein the first sensor senses the traveling unit, and the second sensor senses the rail protrusion, wherein the traveling wheel is configured to travel on the rail such that the traveling wheel is located at a position on the rail corresponding to the rail protrusion with respect to the first direction at a time when the traveling unit passes the rail protrusion.

12. The article transfer device of claim 11, wherein the first and second sensors are placed at the same position as each other along the rail on a basis of the first direction.

13. The article transfer device of claim 11, further comprising:

a base panel overlapping the rail unit, wherein the sensor unit is disposed adjacent to the base panel.

14. The article transfer device of claim 11, wherein the first sensor measures a diameter of the traveling wheel through a difference between a distance to an upper surface of the traveling wheel and a distance to an upper surface of the rail, and wherein the second sensor measures a descending height of the rail when the traveling wheel travels on the rail, through a difference between a distance to a lowest point of the upper surface of the rail protrusion and a distance to an upper surface of the rail protrusion before the traveling wheel is at a position on the rail corresponding to the rail protrusion.

15. The article transfer device of claim 13, further comprising:

a data controller which calculates a diameter of the traveling wheel based on the descending height of the rail measured by the second sensor and the diameter of the traveling wheel measured by the first sensor.

16. A substrate transfer method, comprising:

detecting entry of a hoist unit by an identification part, wherein the hoist unit is connected to a traveling unit traveling on a rail and including a traveling wheel, wherein the rail extends in a first direction;

measuring, by using a first sensor, a diameter of the traveling wheel at a time when the traveling wheel travels on the rail, to which a rail protrusion is connected; and measuring, by using a second sensor, a descending height of the rail protrusion at the time when traveling wheel travels on the rail, wherein the measuring of the diameter of the traveling wheel is performed at the same time as the measuring of the descending height of the rail protrusion, wherein the first and second sensors are placed at the same position as each other along the rail on a basis of the first direction.

17. The substrate transfer method of claim 16, wherein the first sensor measures a distance to an upper surface of the traveling wheel at the time when the traveling wheel is at a position on the rail corresponding to the rail protrusion, and at the same time, the second sensor measures a distance to a lowest point of the upper surface of the rail protrusion at the time when the traveling wheel travels on the rail.

18. The substrate transfer method of claim 16, wherein the traveling wheel includes a first traveling wheel which travels on the rail, and a second traveling wheel spaced apart from the first traveling wheel in the first direction, and wherein the first sensor measures the diameter of the first traveling wheel and then measures the diameter of the second traveling wheel.

19. The substrate transfer method of claim 16, further comprising:

calculating, using a data controller, the diameter of the traveling wheel, by adjusting the diameter of the traveling wheel measured by the first sensor based on the descending height of the rail measured by the second sensor.

20. The substrate transfer method of claim 19, further comprising:

transmitting information calculated by the data controller to a server.

* * * * *